United States Patent Office 3,523,670
Patented Aug. 11, 1970

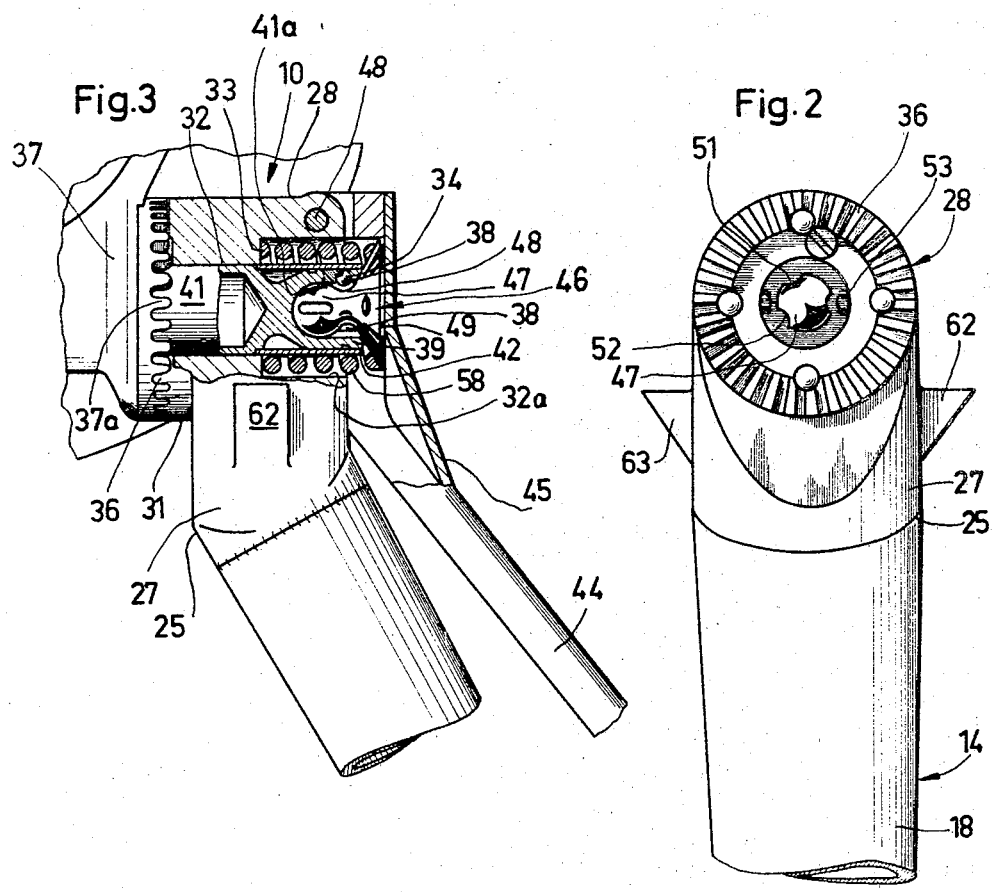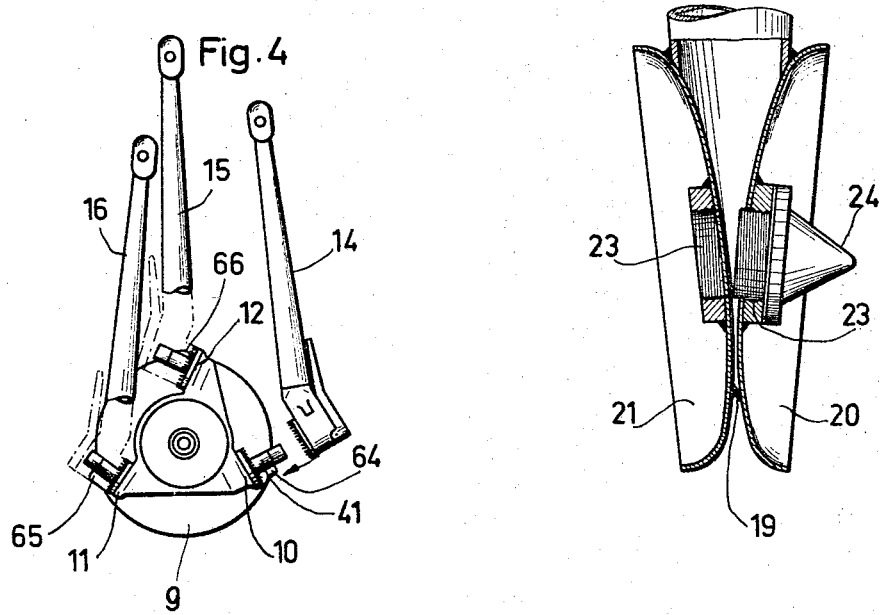

3,523,670
COUPLING DEVICE FOR A TRIPOD
Franz Pfister, Hochstadt, Eicke Maus, Ottobrunn, and Günther Karpa, Riemerling, Germany, assignors to Bolkow Gesellschaft mit beschrankter Haftung, Munich, Germany
Filed Apr. 17, 1968, Ser. No. 722,012
Claims priority, application Germany, Apr. 25, 1967, B 92,217
Int. Cl. F16m 11/38
U.S. Cl. 248—168                     9 Claims

ABSTRACT OF THE DISCLOSURE

A coupling device for pivotally attaching legs to a stand, such as a tripod for a guided missile launcher, is comprised of a number of first coupling sections attached to a support member and a similar number of legs each having a second coupling section at one end for interlocking engagement with the first coupling sections. Each of the first coupling sections has an outwardly extending pivot member onto which is fitted a bore in a second coupling section. Means for interlocking the coupling sections together are biased into position by a spring contained within the bore. A lever is attached to each second coupling section for compressing the spring within the coupling device whereby the second coupling section may be pivoted relative to the support member or the leg may be removed from the support member. The opposite ends of the legs from the coupling sections each has a pair of oppositely facing half-shell base supports. Each base support has a threaded opening for selectively receiving a removable spike member.

SUMMARY OF THE INVENTION

The invention is directed to a tripod or stand for an elevating and traversing launching and/or guidance system for guided missiles, such as are guided to a target by means of a so-called target covering method. More particularly, the invention concerns a coupling device for attaching legs to the tripod whereby the legs may be pivoted relative to the tripod.

Launching and/or guidance systems must not only launch the missile but, in addition, must track it after its take-off during the flying time of the misile, and specifically under combat conditions. Under combat conditions, the position of the device and its orientation must be changed, due both to changes in the distance to the target and to terrain conditions, for example, the launching device may be changed from a position supported directly on the ground to one where it is carried by an individual for firing from the shoulder while in a kneeling, standing or other firing position.

Presently known launching devices can only be used when they are supported on the ground because of their great weight and the bulk of their tripod or stand which hinders the free movement of the person operating the device. In addition, the launching device must be detachable from its tripod for changing positions, see Interavia No. 6, 1964 page 821, and to afford such detachability tools and other auxiliary means are required.

In another known launching device, such as shown in U.S. Pat. No. 2,913,960, the person handling the device may use it without a tripod. However, his freedom of movement is limited because he must carry the tripod separately. Where the tripod is carried separately, it is subject, to a great extent, to the risk of becoming fouled where it is used in marshy terrain, said and the like, or where granades or other missiles strike the ground in the vicinity of the tripod. In such devices, before the tripod can be connected, its bearing or coupling must be cleaned. Where such time consuming steps are required, the speed with which the launching device can be placed into action is unnecessarily delayed. This is especially true for launching devices of the type in question, referred to as light infantry weapons, which require reorientation for properly tracking the missiles to the target, in contrast to the launching device set forth in the above-mentioned patent.

Accordingly, in view of the problems experienced in the known launching devices, it is the primary object of the present invention to afford a tripod or support for an elevating and traversing device for guided missiles which is light in weight and is intended to be attached to the launching device irrespective of the type of use for which it is employed. In particular, the invention is concerned with a coupling device for attaching the legs to a tripod which affords ease in pivotally positioning the legs on or in removing the legs from the tripod.

Another object of the invention is to provide a coupling device which does not require any tools in changing the positions of the legs.

A further object of the invention is to supply a coupling device formed of two coupling sections which can be locked together to hold the leg in position.

Still another object of the invention is to provide a relatively simple arrangement for unlocking the coupling device and pivotally positioning the leg relative to the stand or in removing the leg from the stand.

Moreover, another object of the invention is to provide a tripod arrangement wherein the legs may be easily interchanged without altering the effectiveness of the tripod.

Yet, another object of the invention is to afford a tripod or stand for a missile launching device which is easy to handle in a variety of launching or firing positions.

A further object of the invention is to provide a coupling device which is easy to keep clean and does not require special attention to avoid fouling of its various parts when the launching device is in use.

Therefore, the present invention is directed to a stand or tripod for an elevating and traversing launching and/or guidance device for guided missiles having three legs attached to the stand and spaced 120° apart. The legs are arranged for pivotal movement in a plane disposed perpendicularly to the traversing axis of the missile device. The ends of the legs remote from the couplings are provided with spike-like means intended to grip the supporting surface upon which the device stands. In particular, the invention concerns a coupling device for securing the tripod in which a connector section on the end of each leg is offset from the longitudinal axis of the leg and from the pivotal axis of the coupling device. Further, the end of the legs remote from the coupling device are provided with support members having removable means for gripping the surface on which the launching device is supported. The manner in which the legs are coupled to the tripod permit them to be pivoted into the same plane for operating the missile device from the shoulder position.

Another feature of the invention is the use of a hand lever by which the coupling device can be unlocked for moving the legs into at least two different positions.

Due to the arrangement of the coupling device, the legs of the tripod are identical and interchangeable and may be connected to the stand without use of any tools. Instead, by merely operating the hand lever, the legs may be positioned as required, as for example into a plane parallel to the launching tube of the device which makes it unnecessary to remove the tripod from the remainder of the device in changing positions or when the device is being fired from a shoulder position.

The coupling device is comprised of two coupling sections, one secured to the stand or tripod and the other to one end of the tripod legs. The contacting surfaces of the coupling sections are provided with gear toothed surfaces which are kept in engagement by means of a spring contained within one of the coupling sections. A locking device, contained within the coupling section secured to the leg, is formed by a locking member attached to the hand lever which fits into a pivot member extending outwardly from the opposite coupling section. The lock member which is spherical in shape at its point of engagement with the pivot member has slots in its exterior surface into which balls are engaged for locking the two coupling sections together. By means of the hand lever, the spring within the coupling device can be compressed and the locking arrangement released for pivoting a leg relative to the tripod.

Another novel feature of the invention is the arrangement of the coupling section attached to the tripod leg which comprises a first portion secured to the leg and offset from its longitudinal axis. The other part of the coupling section is cylindrical in shape and forms the part which is connected onto the pivot member of the coupling section secured to the tripod. A bore extends through the cylindrical portion and is arranged to receive the spring which maintains the two coupling sections in interlocking engagement. In addition, the pivot member of the coupling device fits within the bore of the coupling section attached to the leg. By means of this coupling device, the tripod legs which are identical, can be positioned on any of the coupling sections attached to the tripod stand. Once in position on the tripod a leg can be pivotally repositioned by merely operating the hand lever attached to the coupling device. In order to convert the tripod of the launching device from a ground supported position to use as a shoulder-fired device, it is only necessary to move the legs into a common plane generally parallel with the barrel of the launching device by operating the hand lever. In this new position, each leg is again locked in place and the launching device can be handled for shoulder firing with the tripod attached to it. In the past, it has been necessary to remove the tripod or stand from the launching device when changing over to the shoulder firing position. Further, because constant mounting and dismounting of the tripod on the launching device is unnecessary, the likelihood that the coupling device will become fouled by foreign materials is slight. Due to the arrangement of the coupling device, it can be easily cleaned in the event dirt or other materials penetrate its interior. The hand lever which operates the coupling is pin connected to the coupling device and is easily manipulated for any required cleaning operations. As mentioned above, tools or other means are not required for pivotally repositioning the leg or for cleaning the coupling device.

On the coupling section, the interior of one pivot member is partly hollow in form and has a generally double conical shape with its outer end forming a socket for the locking member mounted on the hand lever.

Another feature of the launching device is the provision of lugs on the castings forming the coupling sections which cooperate with corresponding lugs on the stand to prevent sagging of the launching device at the adjacent ends of the legs. The lugs are provided on both sides of the casting to assure, as the leg is positioned relative to the tripod, that there is a lug in contact with the lug on the stand.

Moreover, a further important feature of the invention is the provision of a pair of support surfaces at the ends of the legs remote from the stand. Each of the support surfaces, which face in opposite directions, contains a threaded opening for the reception of a spike-like peg which assures a holding or gripping action with the supporting surface of the tripod. Since the support surface is provided on each of a pair of opposite side of the leg, the spike-like peg can be removed from the side which is not in bearing contact with the support surface of the tripod and the possibility of injury to the personnel operating the launching device by stepping or falling on the projecting spike-like member is avoided.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 2 is a partial side view of a leg of the tripod shown in FIG. 1 affording an end view of the coupling section mounted on the end of the leg;

FIG. 3 is a partial sectional view of a leg and the tripod stand illustrating the coupling device of the present invention; and FIG. 4 illustrates a bottom view of the tripod shown in FIG. 1 in which the legs are pivoted to extend in the same direction.

DETAILED DESCRIPTION OF THE INVENTION

Figure 1:
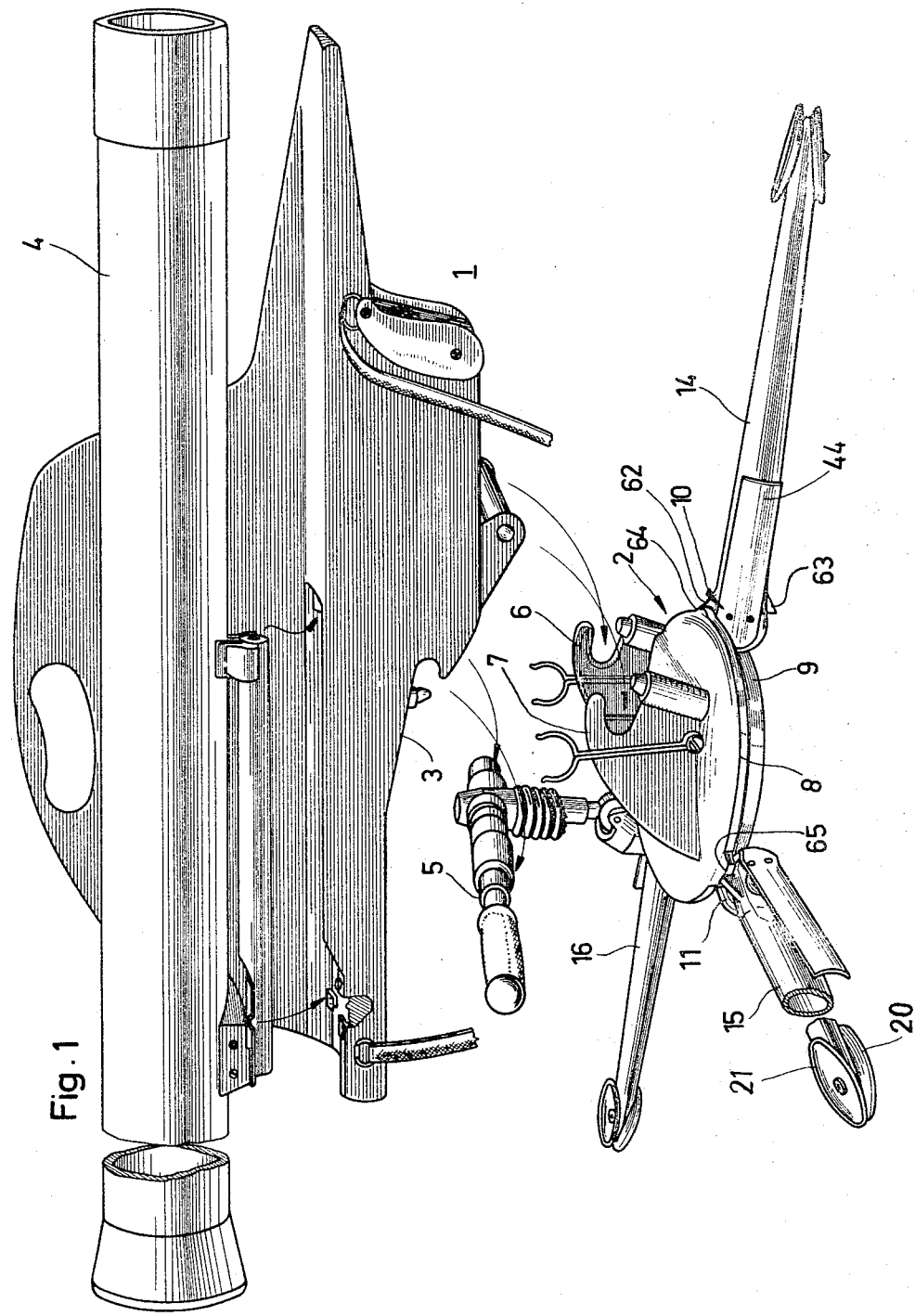
FIG. 1 is a perspective representation of a launching device in accordance with the present invention showing the tripod and the combined gunstock and launching tube in a separated arrangement.

In FIG. 1, a launching and guidance device 1 for guided missiles is formed of a tripod or stand 2, an intermediate piece or gunstock 3, and a launching tube 4 mounted on the gunstock. For purposes of description, the gunstock 3 and the launching tube 4 are shown displaced from the stand 2 and the gunstock is connected to the stand by means of an elevating arc gear 5 and by two traversing arm 6 and 7 mounted in parallel relationship to each other.

The stand comprises a disk-shaped upper part 8 and a bottom part 9 which are interconnected for rotation in a manner which is not represented in the drawing and thereby forming a traversing gear. Upper part 8 supports the traverse arms 6 and 7. At the periphery of the bottom part 9 spaced 120° apart are three coupling sections 10, 11 and 12 for the three legs 14, 15 and 16, respectively of the stand. The three legs of the stand are identical, and as can be seen from FIGS. 2 and 3, each leg is composed of a tube 18 having a transverse oval cross section and tapering toward the free or support end 19 of the leg. At the free end 19 of the leg, a pair of oppositely facing half-shell-like support members 20, 21 are provided. Centered in each of the support members is a threaded opening 23 arranged to receive a similarly threaded spike-shaped peg 24. When in use, only one of the support members 20, 21 contacts the support surface for the device, accordingly, the other member does not require the spike-shaped peg and it is removed to avoid any injury to the operating personnel. At the tripod end of each leg, the tube 18 has an offset section 25 which connects the coupling casting 27 to the leg. The casting 27 is disposed at an angle to the longitudinal axis of the leg and at its side oppoiste the offset 25, there is a cylinder 28 disposed transversely to the longitudinal direction of the leg. At one end, the cylinder 28 extends beyond the casting 27 and forms an abutment surface 31. Extending through the cylinder 28 is a bore 32 and a portion of the bore 32a at the end opposite the abutment surface 31 has an increased diameter which forms a shoulder 33.

The end face of the abutment surface 31 is provided with gear teeth 36 which cooperate with similar gear teeth 37a arranged on the coupling section 37 secured to the bottom part 9 of the stand 2. Disposed centrally of and extending outwardly from the coupling section 37 is a pivot member 41 which extends into the bore 32 within the cylinder 28. The pivot member 41 is partly hollow having a generally double conical shape providing a socket 41a in its outer end. In the outer portion of the bore 39 spaced inwardly from the increased diameter portion 32a there is a sleeve 42 within which three balls 38 are positioned in bores 34. For removably locking the coupling section provided by the cylinder 28 to the coupling section 37 attached to the stand, a hand lever 44 is connected to the cylinder 28 by means of a pin 43. The hand lever extends from the cylinder 28 in the same direction as the tubular section 18 of the leg but is offset at a somewhat greater angle relative to the cylinder than the leg itself. A reinforcing rib 45 is provided on the hand lever extending from the cylinder 28 to an outer portion of the lever, see FIG. 3.

Attached to the hand lever 44 is a locking member 46 which is made up of a spherically-shaped section 47 connected to the lever by means of a neck 48 and a truncated cone section 49. The neck 48 has a considerably smaller diameter than that of the spherically-shaped section 47, and the diameter of the base of the truncated cone section attached to the hand lever 44 has a diameter substantially similar to that of the bore. Disposed at irregular spaced positions about the periphery of the spherically-shaped section 47 are three slots 51, 52 and 53, see FIG. 2. When in the locked position, the balls 38 contained within the bores 34 extend inwardly from the pivot member 41 into the slots. By rotating the two coupling sections, the balls 38 and the slots 51, 52 and 53 are aligned to provide the necessary interlocking engagement. Similarly, the gear surface 37a of the coupling section attached to the stand and the oppositely facing gear surface 36 of the cylinder are in interlocking engagement.

Within the increased diameter section 32a of the bore 32, a spring 58 bears at one end against the shoulders 33 and at its opposite end against the hand lever 44 and acts to keep the two coupling sections in interlocked engagement by maintaining the balls 38 in position in the slots on the periphery of the spherically-shaped section 47 of the locking member 46. When it is desired to reposition the leg, the hand lever 44 is depressed and, in turn, compresses the spring 58 causing the balls 38 to be displaced to the neck section 48 of the locking member 46 so that free play is provided between the cylinder 28 and the pivot member 41. In this position, the gear surfaces 36, 37a can be disengaged and the cylinder 28 pivotally moved about the pivot member 41 of if the balls and the slots in the spherically-shaped section 47 are aligned the leg can be removed from the stand.

On opposite sides of the casting 27 extending perpendicularly to the hand lever 44 are a pair of projecting stops 62, 62, one of which is arranged to cooperate with the lugs 64, 65, 66 attached to and extending outwardly from the periphery of the upper part 8 of the stand 2. These lugs 64, 64 and 66 prevent sagging of the launching device to avoid any possibility of hand injuries to the operating personnel. The stops 62, 63, situated on opposie sides of the casting, assure the interchangeability of the legs from one coupling section to another on the stand.

As described above by depressing the hand lever 44 on each of the legs, the locking action between the coupling sections can be released and each leg moved about the pivot member 41 into the position illustrated in FIG. 4. Once in this position, by releasing the hand lever, the locking action is reestablished and the legs can be kept in this displaced position when the launching device is operated from the shoulder position.

While the arrangement of the coupling device reduces the possibility of foreign materials entering the interlocking sections, the hand lever can be pivoted about the pin 43 and the coupling sections separated, removed from the stand and cleaned of any material which might impede proper operation.

In view of the above description, it will be appreciated that the identical legs can be interchanged without the use of any tools or other means and while not in use as a tripod the legs can be pivoted into a position where they do not hinder the personnel operating the launching device. These advantages also apply to other types of launching devices, for example, to launching devices for ballistic missiles, projectiles, and the like. Moreover, it will be understood by those skilled in the art that the coupling device can be utilized on a variety of stands or support surfaces having legs that are pivoted between at least two positions.

While a specific embodiment of the invention has been shown and described in detail to illustrate the application of the inventive principles, it will be understood that the invention may be embodied otherwise without departing from such principles.

What is claimed is:

1. A coupling device for securing a movably positionable leg to a support member comprises a plate, a first coupling section secured to said plate, a longitudinally extending leg, a pivot member attached to and extending outwardly from said first coupling section, a second coupling section secured to one end of said leg and arranged to fit onto said pivot member and to fit in interengaged relationship with said first coupling section, means for locking said first and second coupling section together, means for releasing said locking means for effecting pivotal movement of said leg and said second coupling section about the pivot member on said first coupling section, said second coupling section having a bore therethrough arranged to receive said pivot member on said first coupling section, said means for locking said first and second coupling sections together disposed within said bore extending into engagement with the outer end of said pivot member within said bore, said pivot member having a socket in its outer end, said means for releasing said locking means comprising a hand lever attached to said second coupling section and extending across the end of said bore in said second coupling section remote from said first coupling section, a locking member secured to said hand lever and extending inwardly therefrom into the bore and fitting into the socket in the end of said pivot member, said locking member having slots in its surface, and said means for locking said first and second coupling together comprising a ball means located within said bore and arranged to be urged into locking engagement with the slots in said locking member.

2. A coupling device as set forth in claim 1, wherein a spring is disposed within the bore extending between said second coupling section and said lever for biasing said second coupling section into engagement with said first coupling section and for urging said ball means into locking engagement within the slots in said locking member whereby said spring can be compressed by means of said hand lever for releasing said balls from the slots in said locking member and thereby unlocking said second coupling section from said first coupling section and affording pivotal movement therebetween.

3. A coupling device as set forth in claim 2, wherein said locking member has a spherically shaped section arranged to be inserted into the socket formed in said pivot member and is joined to a truncated conical section attached to said hand lever by means of a neck section having a diameter less than the diameter of said spherically-shaped section, said spherically-shaped section having slots in the periphery thereof for receiving said balls in the locked position of the coupling device, whereby said spring is depressed by said hand lever, said balls are displaced from the slots into the neck section of said locking member affording freedom of pivotal movement of said second coupling section about said pivot member of said first coupling section.

4. A coupling device as set forth in claim 2, wherein the bore within said second coupling section is formed by a first part extending through said second coupling section and a second part concentric with the first part and having an increased diameter and extending from a point intermediate the ends of the bore to the end remote from said first coupling section, said spring disposed within the second part of the bore and bearing against said second-coupling section at one end and said hand lever at the opposite end, and a sleeve positioned within the bore separating the first and second parts thereof with said balls arranged to be disposed in locking engagement with said locking member located interiorly of said sleeve.

5. A coupling device as set forth in claim 1, wherein said hand lever is pin connected to said second coupling section.

6. A coupling device for securing a movably positionable leg to a support member comprises a plate, a first coupling section secured to said plate, a longitudinally extending leg, a pivot member attached to and extending outwardly from said first coupling section, a second coupling section secured to one end of said leg and arranged to fit onto said pivot member and to fit in interengaged relationship with said first coupling section, means for locking said first and second coupling sections together, means for releasing said locking means for effecting pivotal movement of said leg and said second coupling section about the pivot member on said first coupling section, said leg having a pair of half-shell-like base supports attached to its end remote from said second coupling section, and said base supports disposed on opposite sides of said leg and being located in planes extending in the general direction of the axis of said leg.

7. A coupling device as set forth in claim 6, wherein said half-shell-like base supports have a threaded opening in the center thereof, and a removable peg threaded on one end for engagement within said opening and having a pointed configuration at the other end arranged to be directed outwardly from said base support.

8. A stand of the tripod-type for a device for launching and/or guiding missiles comprises a plate, three first coupling sections secured to said plate in angular equi-spaced relationship, a leg for each said first coupling section, a second coupling section secured to one end of each of said legs for interlocking engagement with one of said first coupling sections, a pivot member in each of said first coupling sections for interengagement within said second coupling section for pivoting said legs relative to said plate, said second coupling section having its axis disposed transverse to the axis of said leg to which it is attached, means for locking said first and second coupling sections together, means for releasing said locking means for pivotally displacing said legs relative to said plate and for removing said legs from said plate; said legs extending longitudinally from said second coupling sections and having a hollow oval shape in transverse section, a pair of half-shell-like base supports on the opposite ends of said legs from said plate arranged to face in opposite directions in planes extending in the same general direction as the axis of said legs.

9. A tripod for a guided missile launcher, the tripod comprised of a bearing plate and three legs mounted on said bearing plate and mutually spaced 120° apart thereon, said legs mounted on said bearing plate so as to be pivoted between an operative support position and an inoperative rest position and in the rest position said legs being oriented in the same direction and disposed in one plane containing their bearing points on said bearing plate, wherein the improvement comprises three first coupling sections mutually spaced 120° apart on said bearing plate, each said coupling section comprising a bearing pivot member formed on said plate, a gear tooth member secured to said plate and concentrically disposed about said pivot member, each said leg comprising a second coupling section arranged to engage one of said first coupling sections in a pivotal and removable manner each said second coupling section being offset angularly to the longitudinal direction of said leg to which it is attached, a gear tooth member on each of said second coupling sections arranged to engage one of said gear tooth member on said first coupling section and a coupling member centrally disposed within each of said gear tooth members on said second coupling section and arranged to engage one of said pivot members on said first coupling section in an interlocking and manually releasable manner.

References Cited

UNITED STATES PATENTS

| | | | |
|---|---|---|---|
| 413,118 | 10/1889 | Warner | 287—14 |
| 437,650 | 9/1890 | Huntington | 287—14 |
| 1,031,075 | 7/1912 | Lundin | 287—14 |
| 1,074,272 | 9/1913 | Kline | 287—14 |
| 1,671,282 | 5/1928 | Gorton | 89—40.16 |
| 3,011,409 | 12/1961 | Musser | 248—168 |
| 3,021,158 | 2/1962 | Seizinger | 287—14 |
| 3,087,701 | 4/1963 | Wallace | 248—166 |

FOREIGN PATENTS

| | | |
|---|---|---|
| 14,280 | 10/1915 | Great Britain. |
| 430,100 | 8/1967 | Switzerland. |

MARION PARSONS, JR., Primary Examiner

U.S. Cl. X.R.

89—1.815, 40; 287—14, 99